June 26, 1923.
W. T. HARMON
ANIMAL TRAP
Filed Aug. 14, 1922
1,460,199
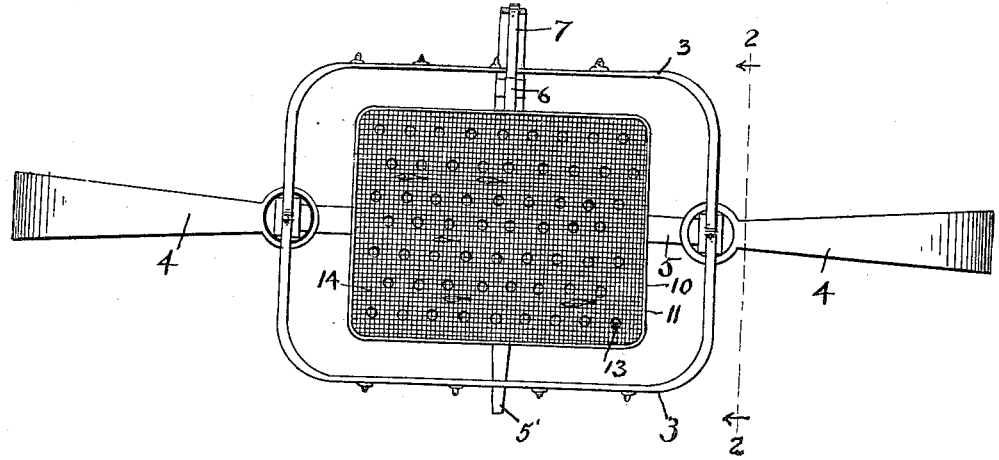
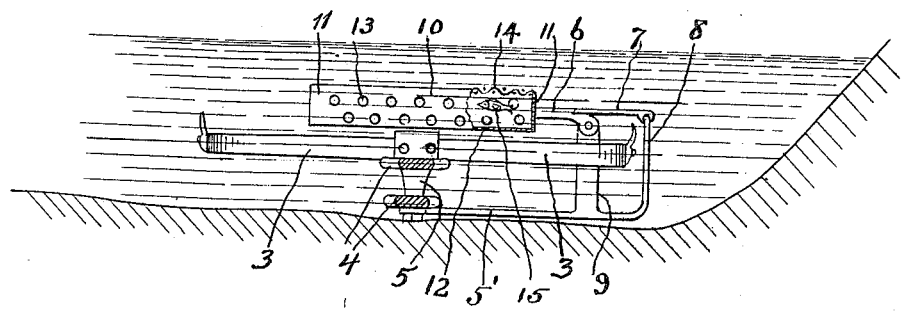
Inventor:
Willie T. Harmon
by J. W. Bates
Atty.

Patented June 26, 1923.

1,460,199

UNITED STATES PATENT OFFICE.

WILLIE T. HARMON, OF SANGERVILLE, MAINE.

ANIMAL TRAP.

Application filed August 14, 1922. Serial No. 581,605.

*To all whom it may concern:*

Be it known that I, WILLIE T. HARMON, a citizen of the United States, residing at Sangerville, in the county of Piscataquis and State of Maine, have invented certain new and useful Improvements in Animal Traps, of which the following is a specification.

My invention relates to animal traps such as are commonly used in catching wild animals and particularly to spring jaw traps for catching fur bearing animals.

These latter traps consist essentially of a pair of jaws held apart by a suitable trigger and forced together by powerful springs, the trigger being connected with a flat plate or trencher upon which the animal is supposed to step to spring the trap. My trap is designed more particularly for catching swimming fur bearing animals and it has connected with the trigger a trencher in the form of a chamber for holding and retaining live bait, particularly small fish.

The trencher or chamber is preferably in the form of a relatively large flat shallow structure closed on top with wire netting through which the fish may be easily seen and at the sides and bottom with perforated metal allowing sufficient water to circulate through the chamber to keep the fish alive.

The trap is preferably set on the bottom of a stream or pond in about one foot of water so that the animal may swim freely over it and the jaws are sufficiently large so that they will snap together and imprison the animal.

I have illustrated my invention in the accompanying drawing in which is shown a trap constructed in accordance with my invention.

Referring to the drawing:

Fig. 1 is a plan of the trap with the jaws open and apart ready to be sprung and, Fig. 2 is a section taken on the line 2—2 of Fig. 1.

Referring to the drawing, 3—3 are the jaws hinged or pivoted to the base bar 5 extending entirely across the trap, said bar having laterally extending branches 5′ substantially midway of the bar 5 and 4—4 are the springs for closing the jaws; 8 represents an upturned portion of one of the said arms 5′ to which is pivoted the catch 7 and the trigger 6 is pivoted to another upturned portion 9 of the arm 5′, these parts being in the form in which traps of this class are commonly made.

According to my invention, I secure to the trigger 6 a chamber 10 which takes the place of the flat trencher or plate upon which the animal is supposed to step. This chamber 10 is composed of a perforated bottom 12 and side pieces 11 formed of sheet metal or other suitable material and having holes 13 for freely admitting water into the chamber.

The top of the shallow chamber is closed by wire netting 14 through which the live bait can be plainly seen.

In trapping fur bearing animals, I make use of minnows or small fish 15 which are enclosed in the chamber 10. The cover 14 is designed to be easily removable and is fastened in position in any well known manner so that the fish will be held in place and can swim about freely in the water contained in the chamber.

It will be readily seen that a trap constructed as I have described with a chamber having perforated walls which will retain live bait will be far more attractive to wild animals than traps baited in the ordinary manner.

This is particularly true of the swimming fur bearing animals such as mink, otter, fisher, muskrat and others of this character.

My trap can also be used for land animals as well as swimming animals as for instance, by enclosing a mouse within the chamber or trencher and setting the trap thus baited for foxes or other animals who live on mice.

The invention may be used in connection with a great variety of traps by connecting the trigger or mechanism by which the trap is sprung with a chamber for retaining live bait.

I claim:—

1. A spring actuated jaw under-water animal trap having the trigger trencher formed of a closed receptacle with perforated walls for receiving and retaining swimming live bait, whereby the trencher is relieved of the weight of the live bait when the trap is set for operation under water.

2. A spring actuated jaw animal trap having a relatively flat trigger trencher composed of a shallow chamber with perforated walls for enclosing and retaining live swimming bait.

WILLIE T. HARMON.